United States Patent [19]

Olson et al.

[11] Patent Number: 5,084,493

[45] Date of Patent: Jan. 28, 1992

[54] WATER SOLUBLE CRAYON COMPOSITIONS

[75] Inventors: James D. Olson, Charleston; Jerry R. Hale, Jr., Hurricane; Robert M. Weinheimer, Charleston, all of W. Va.

[73] Assignee: Union Carbide Chemicals & Plastics Technology Corporation, Danbury, Conn.

[21] Appl. No.: 452,474

[22] Filed: Dec. 19, 1989

[51] Int. Cl.$^5$ .................. C09D 13/00; C08L 63/00
[52] U.S. Cl. ................... 523/164; 523/436; 525/523; 524/451
[58] Field of Search .............. 523/164, 436; 525/523

[56] References Cited

U.S. PATENT DOCUMENTS

| | | | |
|---|---|---|---|
| 2,872,432 | 2/1959 | Metzger | 260/45.5 |
| 3,670,045 | 6/1972 | Koleske et al. | 260/830 R |
| 3,933,708 | 1/1976 | Brinkman | 260/23 H |
| 3,957,495 | 5/1976 | Teranishi et al. | 106/19 |
| 4,102,795 | 7/1978 | Minegishi et al. | 252/8.9 |
| 4,212,786 | 7/1980 | Muraksami | 260/31.2 R |
| 4,411,775 | 10/1983 | McCoy et al. | 208/188 |
| 4,741,774 | 5/1988 | Lazar | 106/19 |
| 4,840,669 | 6/1989 | Hughes et al. | 106/19 |
| 4,840,670 | 6/1989 | Hughes et al. | 106/19 |
| 4,859,242 | 8/1989 | Hughes et al. | 106/19 |

FOREIGN PATENT DOCUMENTS

| | | |
|---|---|---|
| 210496 | 2/1983 | Czechoslovakia . |
| 004128 | 2/1976 | Japan . |
| 058621 | 5/1977 | Japan . |
| 024326 | 8/1979 | Japan . |
| 059879 | 5/1981 | Japan . |
| 034240 | 8/1981 | Japan . |
| 092069 | 6/1982 | Japan . |
| 162673 | 9/1983 | Japan . |
| 5918772 | 1/1984 | Japan . |
| 096179 | 6/1984 | Japan . |
| 023464 | 2/1985 | Japan . |
| 121778 | 6/1987 | Japan . |
| 057683 | 3/1988 | Japan . |
| 1250166 | 10/1971 | United Kingdom . |
| 1548901 | 7/1979 | United Kingdom . |

*Primary Examiner*—Paul R. Michl
*Assistant Examiner*—Yong S. Lee
*Attorney, Agent, or Firm*—Gerald L. Coon

[57] ABSTRACT

This invention relates to water soluble crayon compositions which are comprised of (i) one or more water soluble block polymers characterized by an ABCBA structure and (ii) a coloring agent, and to crayons produced therefrom. This invention also relates to processes for the production of water soluble crayon compositions and for the manufacture of crayons.

79 Claims, No Drawings

WATER SOLUBLE CRAYON COMPOSITIONS

RELATED APPLICATION

U.S. patent application Ser. No. 07/452,475 filed Dec. 19, 1989 and commonly assigned.

BRIEF SUMMARY OF THE INVENTION

1. Technical Field

This invention relates to water soluble crayon compositions which are comprised of (i) one or more water soluble block polymers characterized by an ABCBA structure and (ii) a coloring agent, and to crayons produced therefrom. This invention also relates to processes for the production of water soluble crayon compositions and for the manufacture of crayons.

2. Background of the Invention

Various drawing, writing and marking compositions are known in the art such as crayon compositions, color pencil compositions and the like. Crayons are generally prepared by mixing together one or more natural or synthetic waxes such as water insoluble paraffin, carnauba wax, hydrocarbon waxes and the like in a molten state in a suitable combination in accordance with the quality of crayon required, adding talc to the molten mixture as a binder, adding a pigment to the molten mixture as a coloring agent, pouring the resulting composition into a specified mold and solidifying the composition by cooling.

U.S. Pat. No. 4,212,786 discloses a crayon composition containing, based on 100 parts by weight of the composition, (a) 10 to 30 parts by weight of at least one of cellulose resin and vinyl resin, (b) 5 to 30 parts by weight of at least one of ketone resin, xylene resin, amide resin and terpene resin, (c) 2 to 12 parts by weight of at least one of dibenzylidene sorbitol, tribenzylidene sorbitol and derivatives of the sorbitols, (d) 25 to 60 parts by weight of at least one of glycols, ethers of glycols, ether esters of glycols and benzoic acid esters, and (e) 2 to 30 parts by weight of a pigment or 2 to 10 parts by weight of an oil-soluble dye.

U.S. Pat. No. 3,933,708 describes a crayon wax composition having a wax base, stearic acid, pigment and an additive mixture which contains polyethylene having a molecular weight between 500,000–6,000,000. It is stated that the use of polyethylene in small amounts enables the replacement of higher melting point waxes with low-melting point paraffin wax of 120° F.–140° F., while still maintaining the required performance qualities of the crayon wax.

U.S. Pat. No. 4,741,774 relates to a plastic colored crayon which contains an outer layer of plastic and an inner, abradable, colored core containing a mixture of ethyl hydroxyethyl cellulose, a plastic binder, wax and coloring matter. The ethyl hydroxyethyl cellulose is present from 8–30 percent by weight of the colored core.

U.S. Pat. No. 3,957,495 discloses a writing material in solid form containing a solid vehicle in which is dispersed a non-volatile oily solvent containing an electron donative chromogenic compound of substantially colorless character which develops color upon contact with an electron accepting substance, more than 50 percent by weight of the solid vehicle being an ester of a higher (hydroxy) fatty acid or a mixture containing an ester of a higher (hydroxy) fatty acid and a microcrystalline wax, and the non-volatile oily solvent being contained in the writing material in a range of from 10 to 50 percent by weight of the entire writing material.

U.S. Pat. Nos. 4,840,669, 4,840,670 and 4,859,242 describe a water soluble paint composition containing water, a polymeric thickener to maintain solid components such as coloring agents and sparkle or glitter in a uniform and permanent suspension, a water soluble wax to thicken and harden the composition, glycerin and the like to increase the time span of hardening to enable the mixture to flow without undue heating, an adhesive thickener, glitter and coloring agents.

Japanese Patent Application No. 63057683 discloses the manufacture of crayons from pressed granules which are obtained by mixing together a metal salt of a higher fatty acid such as calcium stearate or calcium 1,2-hydroxystearate, a pigment and an extender with water and a surfactant. It is stated that polyethylene glycol is also used in the preparation of the pressed granules.

Japanese Patent Application No. 60023464 relates to the manufacture of a phosphorescent substance for color pencils, crayons, inks, etc. The phosphorescent substance is prepared by adding a polycondensation type high polymer, a thermoplastic material, rubber, wax, paraffin, rosin, clay, water solvent, etc. to a quinazolone derivative and dispersing the mixture at normal temperature under heating. It is stated that polyethylene oxide, polypropylene oxide and ethylene oxide/propylene are heated under reflux in a typical preparation step.

Japanese Patent Application No. 59096179 discloses crayon-like writing compositions containing a sodium salt and/or potassium salt of a $C_8$–$C_{22}$ fatty acid, more than one of polyoxyethylene polyol esters or castor oil- or hardened castor oil-ethylene oxide adducts, more than one $C_8$–$C_{22}$ fatty acid and an inorganic pigment or tar coloring matter.

Japanese Patent Application No. 58162673 describes a solid correcting composition used for crayon and pastel work which contains a condensate of a $C_5$–$C_7$ hydric sugar alcohol and aromatic aldehyde and/or hydrogenated castor oil, a water soluble organic solvent, water, a resin emulsion, a water soluble resin and a white pigment. It is stated that preferred water soluble organic solvents include ethylene glycol and propylene glycol among others.

Czechoslovakian Patent No. 210496 relates to a homogeneous composition for water-spreadable leads for crayons which contains fillers (kaolin), pigments, a cellulose derivative, dispersants, ethoxylated nonylphenol, polyethylene glycol having a molecular weight of 500–1300, triglycerides of $C_{16}$–$C_{30}$ fatty acids and spermaceti.

Japanese Patent Application No. 57092069 discloses water soluble crayons prepared by emulsifying compounds of a water soluble polymer solution, waxes, coloring agents and solid emulsifying agents at high temperatures and solidifying the water-in-oil emulsions by cooling.

Japanese Patent Application No. 56059879 describes water soluble drawing materials prepared from water soluble resins and/or waxes, water absorbent polymers, surfactants and pigments. An illustrative water soluble drawing material contains Benzylidene Yellow 2400, polyethylene glycol 1540, polyethylene glycol 2000, polyethylene glycol 4000, Sanwet IM 300 (acrylic grafted starch), a surfactant and denatured alcohol as a mixing aid.

Japanese Patent Application No. 81034240 relates to hydrophilic crayons which contain an oxidized microcrystalline wax, a hydroxyl group-containing compound such as a monohydric alcohol, a polyhydric alcohol, etc., a pigment and optionally a polyethylene wax. The crayon is neither water repellent nor water soluble.

Japanese Patent Application No. 52058621 describes a water soluble crayon composition which contains a paraffin wax, stearic acid, a hardened wax, a pigment, a filler such as talc or calcium carbonate and a mixture of surfactants.

Japanese Patent Application No. 79024326 discloses water soluble rod-shaped drawing materials which are produced by mixing a water soluble wax, a different wax, a lubricating agent, a surfactant and a pigment and subsequently molding the material.

Japanese Patent Application No. 76004128 relates to a waxy crayon obtained by mixing a water soluble paste and a pigment with a polymer emulsion.

United Kingdom Patent No. 1,548,901 discloses a water soluble crayon which contains a fugitive tint, an inert filler such as chalk and a mixture of polyethylene glycols.

United Kingdom Patent No. 1,250,166 describes adhesive crayons which can be removed from a substrate by a water-based treatment. The adhesive crayons contain polyethylene glycol, wood rosin and zinc oxide.

Japanese Patent Application No. 62121778 relates to water soluble coloring compositions which contain a fatty acid ester ethoxylate and a pigment.

Notwithstanding the compositions described above, crayons still remain to be improved since crayons tend to not be completely satisfactory for all desired performance properties. In particular, a broad spectrum or combination of desired performance properties can be difficult to attain primarily due to the various required crayon ingredients utilized in the art. For example, crayons obtained from the use of certain waxes or resins may have high breaking strength, i.e., hardness, but tackiness may be a problem, whereas other different waxes or resins may impart low tackiness to crayons but breaking strength may be a problem.

It would be desirable to provide a crayon composition which affords a broad spectrum or combination of desired performance properties, e.g., non-toxic, good hardness, adhesion and drawability, no tackiness after hardening and mold release, solid state stability at elevated temperatures as in the sun and low viscosity in the liquid state at elevated temperatures for ease in shaping the crayon composition with molds. It would also be desirable to provide a simplified crayon composition having fewer ingredients than utilized in conventional crayon compositions known in the art. It would further be desirable to provide a crayon composition which is water soluble with attendant cleaning advantages for walls, furniture, clothing, etc.

Such crayon compositions are provided by this invention.

DISCLOSURE OF THE INVENTION

This invention relates to water soluble crayon compositions which are comprised of (i) one or more water soluble block polymers characterized by an ABCBA structure and (ii) a coloring agent.

This invention also relates to processes for the manufacture of water soluble crayon compositions which comprise:

(i) preparing an alkoxylation product by contacting an organic compound having at least one active hydrogen with an alkylene oxide in the presence of a catalytically effective amount of an alkoxylation catalyst under alkoxylation conditions;

(ii) preparing a mixture of one or more water soluble block polymers characterized by an ABCBA structure by contacting said alkoxylation product with an epoxide in the presence of a catalytically effective amount of a catalyst; and (iii) preparing said water soluble crayon composition by adding a coloring agent to the mixture of one or more water soluble block polymers characterized by an ABCBA structure.

This invention further relates to crayons prepared from water soluble crayon compositions which are comprised of (i) one or more water soluble block polymers characterized by an ABCBA structure and (ii) a coloring agent.

This invention yet further relates to processes for the manufacture of crayons which comprise:

(i) preparing an alkoxylation product by contacting an organic compound having at least one active hydrogen with an alkylene oxide in the presence of a catalytically effective amount of an alkoxylation catalyst under alkoxylation conditions;

(ii) preparing a mixture of one or more water soluble block polymers characterized by an ABCBA structure by contacting said alkoxylation product with an epoxide in the presence of a catalytically effective amount of a catalyst;

(iii) preparing a water soluble crayon composition by adding a coloring agent to the mixture of one or more water soluble block polymers characterized by an ABCBA structure;

(iv) pouring said water soluble crayon composition into a mold; and (v) solidifying said water soluble crayon composition by cooling.

This invention also relates to crayons prepared by the above processes for the manufacture of crayons.

DETAILED DESCRIPTION

As indicated above, the water soluble crayon compositions of this invention are comprised of one or more water soluble block polymers or copolymers characterized by an ABCBA structure. In particular, the water soluble block polymers characterized by an ABCBA structure are comprised of:

(1) A blocks or segments which can be represented as follows:

$$[R_{20}-]$$

$R_{20}$ is the same or different and is an organic residue of an organic compound having at least one active hydrogen; and wherein the A blocks represent in general from about 10 weight percent or less to about 40 weight percent or greater, preferably from about 15 to about 35 weight percent, of the weight of the ABCBA polymer;

(2) B blocks or segments which can be represented as follows:

$$[-CHR_{21}-CHR_{22}O-]_m$$

wherein $R_{21}$ and $R_{22}$ are the same or different an hydrogen or alkyl (including hydroxy- and halo-substituted alkyl) of, for example, 1 to 28 carbons and m is an integer of at least 1, say, 1 to about 60 or greater; and wherein the B blocks represent in general from about 10 weight percent or less to about 80 weight percent or greater, preferably from about 25 to about 75 weight percent, of the weight of the ABCBA polymer; and (3) a C block or segment which can be represented as follows:

$$[-R_{23}-]$$

wherein $R_{23}$ is an organic residue of an epoxide containing two or more epoxy groups; and wherein the C block represents in general from about 1 to about 20 weight percent or greater, preferably from about 5 to about 15 weight percent, of the weight of the ABCBA polymer.

Each terminal oxy moiety, i.e., —O—, of the B block is individually connected to the terminal alkylene moiety, i.e., —CH$_2$—, of the C block through a monovalent bond to form an oxyalkylene group, i.e., —OCH$_2$—. Each terminal alkylene moiety, i.e., —CHR$_{21}$—, of the B block is individually connected to the terminal oxy moiety, i.e., —O—, of the A block through a monovalent bond to form an oxyalkylene group, i.e., —OCHR$_{21}$—.

The water soluble block polymers characterized by an ABCBA structure which are useful in this invention have an average molecular weight of from about 500 to about 10,000, preferably from about 1,500 to about 7,500. For purposes of this invention, the average molecular weight should be sufficient to provide solid water soluble block polymers characterized by an ABCBA structure at room temperature.

The A blocks or segments can be the same or different and represent an organic residue of an organic compound having at least one active hydrogen. Suitable organic compounds having active hydrogens include alcohols (mono-, di- and polyhydric alcohols), phenols, carboxylic acids (mono-, di- and polyacids), and amines (primary and secondary). The organic compounds may contain 1. carbon to about 100 or 150 carbons (in the case of polyol polymers) and may contain aliphatic and/or aromatic structures. Most often, the organic compounds are monohydric alcohols having 1 to about 30 carbon atoms. The organic compounds having active hydrogens can be the products of hydroformylation/hydrogenation reactions.

In those instances where the A blocks or segments represent an organic residue of an organic compound having 2 or more active hydrogens, e.g., di- and polyhydric alcohols, the water soluble block polymers characterized by an ABCBA structure can be at least partially crosslinked. However, for purposes of this invention, it is desirable that the degree of crosslinking does not exceed that which would lead to a suitable low viscosity product in the molten state.

Particularly preferred alcohols are primary and secondary monohydric alcohols which are straight or branched chain such as methanol, ethanol, propanol, pentanol, hexanol, heptanol, octanol, nonanol, decanol, undecanol, dodecanol, tridecanol, tetradecanol, pentadecanol, hexadecanol, octadecanol, isopropyl alcohol, 2-ethylhexanol, sec-butanol, isobutangl, 2-pentanol, 3-pentanol and isodecanol. Particularly suitable alcohols are linear and branched primary alcohols (including mixtures) such as produced by the Ziegler oligomerization/oxidation process and the "Oxo" reaction of $C_3$ to $C_{20}$ olefins. The alcohols may also be cycloaliphatic such as cyclopentanol, cyclohexanol, cycloheptanol, cyclooctanol, as well as aromatic substituted aliphatic alcohols such as benzyl alcohol, phenylethyl alcohol and phenylpropyl alcohol. Other aliphatic structures include 2-methoxyethanol and the like. Halo-substituted alcohols and silicon-containing organic compounds having at least one active hydrogen may also be useful in this invention.

Phenols include alkylphenols of up to 30 carbons such a p-methylphenol, p-ethylphenol, p-butylphenol, p-heptylphenol, p-nonylphenol, dinonylphenol and p-decylphenol. The aromatic radicals may contain other substituents such as halide atoms.

Alcohols (polyols) having 2 or more hydroxyl groups, e.g., about 2 to 6 hydroxyl groups and have 2 to 30 carbons, include glycols such as ethylene glycol, propylene glycol, butylene glycol, pentylene glycol, hexylene glycol, neopentylene glycol, decylene glycol, diethylene glycol, triethylene glycol and dipropylene glycol. Other polyols include glycerine, 1,3-propanediol, pentaerythritol, galactitol, sorbitol, mannitol, erythritol, trimethylolethane and trimethylolpropane.

The B blocks or segments can be the same or different and represent oxyalkylene units. The alkylene oxides which provide the oxyalkylene units in the alkoxylated products include alkylene oxides such as ethylene oxide, propylene oxide, 1,2-butylene oxide, 2,3-butylene oxide, 1,2- and 2,3-pentylene oxide, cyclohexylene oxide, 1,2-hexylene oxide, 1,2-octylene oxide, and 1,2-decylene oxide; epoxidized fatty alcohols such as epoxidized soybean fatty alcohols and epoxidized linseed fatty alcohols; aromatic epoxides such as styrene oxide and 2-methylstyrene oxide; and hydroxy- and halogen-substituted alkylene oxides such as glycidol, epichlorhydrin and epibromhydrin. The preferred alkylene oxides are ethylene oxide, propylene oxide or mixtures thereof. For purposes of this invention, the water soluble block polymers characterized by an ABCBA structure contain sufficient ethylene oxide to impart water solubility thereto.

The selection of the organic residue of an organic compound having at least one active hydrogen and the oxyalkylene moieties is based on the particular properties desired in the resulting alkoxylation product. Advantageously, narrow distributions of alkoxylate species can be obtained using a wide variety of compounds having active hydrogens, especially monohydric alcohols, which provide desirable alkoxylation products for use in the manufacture of water soluble crayon compositions. Because of the narrow alkoxylate species distribution of the alkoxylation product, these especially attractive alkoxylation products can provide a highly desirable balance of performance properties in water soluble crayon compositions. Hence, the organic compound often comprises a monohydric alcohol of about 8 to 20 carbons and the alkylene oxide comprises ethylene oxide.

In a preferred embodiment, the A and B blocks or segments together represent the residue of fatty alcohol ethoxylates. The fatty alcohol ethoxylates, some of which are known under such nonionic surfactant tradenames as NEODOL ®, ALFONIC ®, TER-GITOL ®, etc., are manufactured by ethoxylation of linear or branched $C_{10}$–$C_{16}$ saturated alcohols; they are produced over a molecular weight range of about 250 to about 3,000. It is in the production of these and other performance type, premium quality ethoxylates that certain calcium-containing catalysts described hereinbelow offer advantages relative to the usual homogeneous ethoxylation catalysts such as sodium hydroxide, potassium hydroxide and the like.

The C block or segment represents an organic residue of an epoxide containing two or more epoxy groups. The epoxy groups can be terminal epoxy groups or internal epoxy groups. Illustrative epoxides include glycidyl type epoxides, cyloaliphatic epoxides, aliphatic epoxides, epoxy cresol novolac resins, epoxy phenol novolac resins, polynuclear phenol-glycidyl ether-derived resins, aromatic and heterocyclic glycidyl amine resins, hydantoin epoxy resins, and the like, and mixtures thereof. The selection of the epoxide is based on the particular properties desired in the resulting mixture of water soluble block polymers characterized by an ABCBA structure. Monomers and oligomers of diepoxides are preferred for use in this invention. Also, hindered diepoxides are preferred for use in this invention since unhindered diepoxides may lead to unsuitable high viscosity products in the molten state.

The glycidyl-type epoxides are preferably diglycidyl ethers of bisphenol A which are derived from bisphenol A and epichlorohydrin and have the following formula:

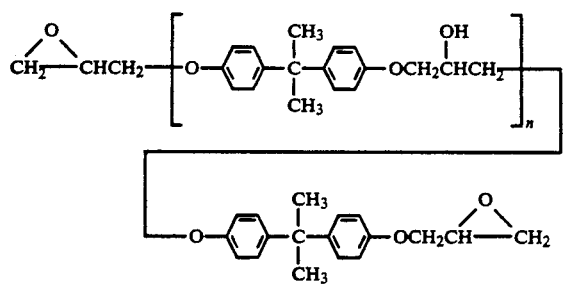

wherein n is an integer of from 0 to about 20 or greater, preferably n is an integer of from 0 to about 3.

Suitable cycloaliphatic epoxides for purposes of this invention are those having an average of two or more epoxy groups per molecule. Illustrative of suitable cycloaliphatic epoxides are the following:

FORMULA I
Diepoxides of cycloaliphatic esters of dicarboxylic acids having the formula:

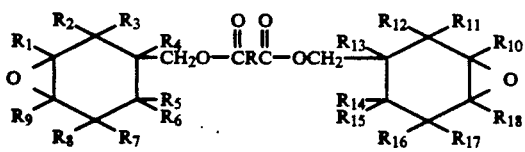

wherein $R_1$ through $R_{18}$ are the same or different and are hydrogen or alkyl radicals generally containing 1 to 9 carbon atoms inclusive, preferably containing 1 to 3 carbon atoms inclusive, as for example, methyl, ethyl, n-propyl, n-butyl, n-hexyl, 2-ethylhexyl, n-octyl, n-nonyl and the like; R is a valance bond or a divalent hydrocarbon radical generally containing 1 to 20 carbon atoms inclusive, preferably containing 4 to 6 carbon atoms inclusive, as for example, alkylene radicals such as trimethylene, tetramethylene, pentamethylene, hexamethylene, 2-ethylhexamethylene, octamethylene, nonamethylene, hexadecamethylene and the like, and cycloaliphatic radicals such as 1,4-cyclohexane, 1,3-cyclohexane, 1,2-cyclohexane and the like.

Suitable epoxides falling within the scope of Formula I are those wherein $R_1$ through $R_{18}$ are hydrogen and R is alkylene containing 4 to 6 carbon atoms. Among specific diepoxides of cycloaliphatic esters of dicarboxylic acids are the following: bis(3,4-epoxycyclohexylmethyl)oxalate; bis(3,-4-epoxycyclohexylmethyl)adipate; bis(3,4-epoxy-6-methylcyclohexylmethyl)adipate; bis(3,4-epoxycyclohexylmethyl)pimelate; and the like. Other suitable compounds are described, for example, in U.S. Pat. No. 2,750,395.

FORMULA II
3,4-Epoxycyclohexylmethyl-3,4-epoxycyclo-hexane carboxylates having the formula:

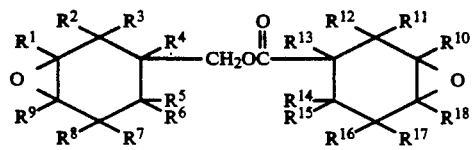

wherein $R^1$ through $R^{18}$ are as defined for $R_1$ to $R_{18}$ in Formula I. Particularly desirable compounds are those wherein $R^1$ through $R^{18}$ are hydrogen.

Among specific compounds falling within the scope of Formula II are the following 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxy-cyclohexylmethyl-6-methyl-3,4-epoxycyclohexane carboxylate; 3,4-epoxy-3-methylcyclohexylmethyl3,4-epoxy-3-methylcyclohexane carboxylate; and 3,4-epoxy-5-methylcyclohexylmethyl-3,4-epoxy-5-methylcyclohexane carboxylate. Other suitable compounds are described, for example, in U.S. Pat. No. 2,890,194.

FORMULA III
Diepoxides having the formula:

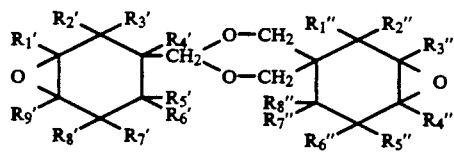

wherein the R single and double primes, which can be the same or different, are monovalent substituents such as hydrogen, halogen, i.e, chlorine, bromine, iodine or fluorine, or monovalent hydrocarbon radicals or radicals as further defined in U.S. Pat. No. 3,318,822. Suitable compounds are those wherein all the R single and double primes are hydrogen.

Other suitable cycloaliphatic epoxides are the following:

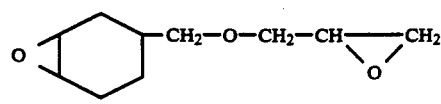

-continued

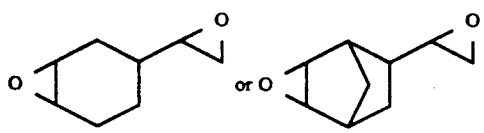

and the like.

Other suitable cycloaliphatic epoxides are the following:

3,4-epoxycyclohexylmethyl-3,4-epoxycyclohexane carboxylate

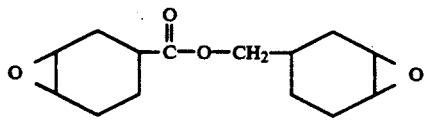

bis(3,4-epoxycyclohexylmethyl)adipate

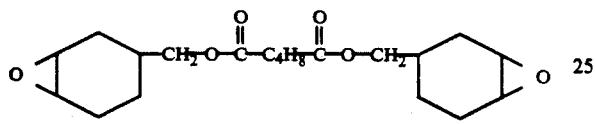

2-(3,4-epoxycyclohexyl-5,5-spiro-3,4-epoxy)cyclohexane-meta-dioxane

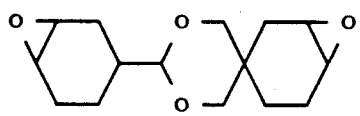

or mixtures thereof.

Epoxides with six membered ring structures may also be used, such as diglycidyl esters of phthalic acid, partially hydrogenated phthalic acid or fully hydrogenated phthalic acid. A representative diglycidyl ester of phthalic acid is the following:

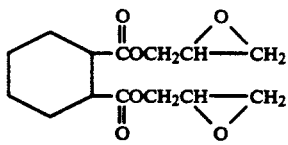

Diglycidyl esters of hexahydrophthalic acids are suitable for use invention.

The epoxy cresol novolac resins are multifunctional, solid polymers characterized by low ionic and hydrolyzable chlorine impurities, high chemical resistance, and thermal performance.

The epoxy phenol novolac resins are generally of the following formula:

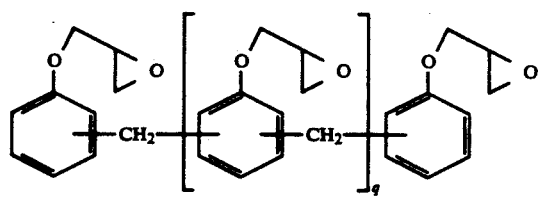

wherein q is an integer of from 0 to about 20 or greater, preferably q is an integer of from 0 to about 3.

The polynuclear phenol-glycidyl ether derived resins are generally of the formula:

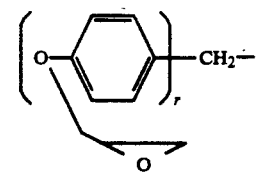

wherein r is an integer of 2.

Among the aromatic and heterocyclic glycidyl amine resins which may be included herein are the following: tetraglycidylmethylenedianiline derived resins of the following formula:

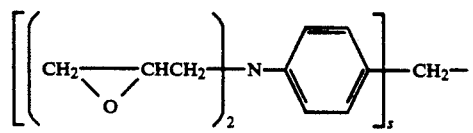

wherein s is an integer of 2; triglycidyl-p-aminophenol derived resins, trazine based resins and hydantoin epoxy resins of the formula:

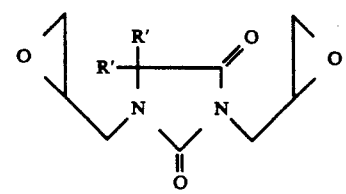

wherein R' is methyl; and heterocyclic diglycidyl amine resins of the formula:

In a preferred embodiment, the organic diepoxy compounds suitable for use in this invention are those comprised of carbon, hydrogen and oxygen atoms, the oxygen being present in the form of oxirane and, optionally, ether and/or ester arrangements. The preferred diepoxy compounds include, for example, the bis(epoxyalkyl)cycloalkanes; the bis(epoxycycloalkyl)ethers, e.g, bis(2,3-epoxycyclopentyl)ether; the bis(epoxyalkoxy)benzenes, e.g., the bis(2,3-epoxypropoxy)benzenes; the bis(epoxyalkoxyphenyl)alkanes, e.g., the diglycidyl ether of 2,2-bis(4-hydroxyphenyl)propane; 3,4-epoxycyclohexylmethyl 3,4-epoxycyclohexanecarboxylate; 4-vinylcyclohexene diepoxide; and the like. The di(epoxyalkyl)diethers of dihydric phenols wherein the epoxyalkyl moiety contains from 2 to 20 carbon atoms are most preferred, especially the diglycidyl diether of 2,2-bis(4-hydroxyphenyl)propane, of hydroquinone, of biphenol, and the like. By the term "dihydric phenol" as used herein is meant that each of the two phenolic hydroxyl groups (—OH) is directly bonded to the same or different benzenoid nucleus.

The water soluble block polymers characterized by an ABCBA structure can comprise from about 1 to about 95 weight percent or greater, preferably from about 50 to about 90 weight percent, of the total weight of the water soluble crayon composition. The amount of water soluble block polymers characterized by an ABCBA structure employed in the water soluble crayon compositions of this invention can vary widely depending on the particular properties desired in the water soluble crayon compositions. The amount of water soluble block polymers characterized by an ABCBA structure employed in the water soluble crayon compositions of this invention should be sufficient to at least partially impart to the water soluble crayon compositions a breaking strength of at least about 1,200 grams as determined herein and a viscosity of no greater than about 650 centistokes at a temperature of 100° C.

As indicated above, this invention also relates to processes for the manufacture of water soluble crayon compositions which comprise:

(i) preparing an alkoxylation product by contacting an organic compound having at least one active hydrogen with an alkylene oxide in the presence of a catalytically effective amount of an alkoxylation catalyst under alkoxylation conditions;

(ii) preparing a mixture of one or more water soluble block polymers characterized by an ABCBA structure by contacting said alkoxylation product with an epoxide in the presence of a catalytically effective amount of a catalyst; and (iii) preparing said water soluble crayon composition by adding a coloring agent to the mixture of one or more water soluble block polymers characterized by an ABCBA structure.

The alkoxylation products prepared in step (i) above comprise alkoxylation species that can be represented by the formula:

$$R_{20}[(CHR_{21}-CHR_{22}O)_mH]_t$$

wherein $R_{20}$ is an organic residue of an organic compound having at least one active hydrogen as described above, t is an integer of at least 1 up to the number of active hydrogens contained by the organic compound, $R_{21}$ and $R_{22}$ may be the same or different and can be hydrogen and alkyl (including hydroxy- and halo-substituted alkyl) of, for example, 1 to 28 carbons as described above, and m is an integer of at least 1, say, 1 to about 60 as described above.

The alkoxylation is conducted using a catalytically effective amount of an alkoxylation catalyst, e.g., about 0.001 to 10, often about 0.5 to 5, weight percent based on the weight of the starter component. The starter component is the organic compound having at least one active hydrogen with which the alkylene oxide reacts. The alkoxylation catalysts substantially retain their activities during the alkoxylation, regardless of the amount of alkylene oxide employed. Thus, the amount of alkoxylation catalyst can be based on the amount of starter provided to the alkoxylation zone and not the degree of alkoxylation to be effected.

A wide variety of alkoxylation catalysts are suitable for use in the process of this invention. The catalyst of choice will depend on whether an alkoxylation product having a narrow distribution or conventional distribution of alkoxylate species is desired. In a preferred embodiment for obtaining alkoxylation products having a narrow distribution of alkoxylate species, suitable alkoxylation catalysts include, for example, calcium-containing catalysts using calcium oxide or calcium hydroxide as sources of the catalytically active calcium, calcium-containing catalysts modified with a divalent or polyvalent oxyacid or metal salt of an oxyacid, calcium sulfate, modified calcium-containing bimetallic or polymetallic catalysts, organic polymer-supported calcium-containing catalysts, modified Group IIIB metal-containing bimetallic or polymetallic catalysts, modified Group IIA metal-containing bimetallic or polymetallic catalysts and other modified bimetallic and polymetallic catalysts described below. Preferred modifiers for the above alkoxylation catalysts include, for example, divalent or polyvalent oxyacids and divalent or polyvalent metal salts of oxyacids. In an embodiment for obtaining alkoxylation products having a conventional distribution of alkoxylate species, suitable alkoxylation catalysts include, for example, sodium hydroxide, potassium hydroxide and the like.

Normally, the alkoxylation catalyst and the starter component are admixed and then the alkylene oxide is added at the reaction temperature until the desired amount of alkylene oxide has been added, then the product is neutralized and can be finished, if desired, in any procedure including stripping unreacted starter material from the product mixture, filtration or further reaction.

The temperature of the alkoxylation is sufficient to provide a suitable rate of reaction and without degradation of the reactants or reaction products. Often, the temperatures range from between about 50° C. and 270° C., e.g., from about 100° C. to 200° C. The pressure may also vary widely, but when low-boiling alkylene oxides such as ethylene oxide and propylene oxide are employed, a pressurized reactor is preferably used.

The alkoxylation reaction medium is preferably agitated to ensure a good dispersal of the reactants and catalyst throughout the reaction medium. Also, the alkylene oxide is usually added at a rate approximating that at which it can be reacted.

Neutralization may assist in the recovery of the catalyst from the alkoxylation product. When neutralizing, acids that may tend to form catalyst-containing gel structures or solids that clog filtering apparatus should be avoided. Conveniently, sulfuric acid, phosphoric acid, propionic acid, benzoic acid and the like are used.

Alkoxylation products useful in this invention and processes for the preparation thereof are generally known in the art. Illustrative processes for preparing alkoxylation products including suitable alkoxylation catalysts which can be useful in this invention are described, for example, in U.S. Pat. No. 4,754,075, U.S. Pat. No. 4,886,917, U.S. Pat. No. 4,820,673, U.S. patent application Ser. No. 251,434, filed Sept. 30, 1988, U.S. patent application Ser. No. 251,430, filed Sept. 30, 1988, U.S. patent application Ser. No. 251,433, filed Sept. 30, 1988, U.S. patent application Ser. No. 251,432, filed Sept. 30, 1988, U.S. patent application Ser. No. 251,436, filed Sept. 30, 1988, U.S. patent application Ser. No. 251,431, filed Sept. 30, 1988, U.S. patent application Ser. No. 102,939, U.S. Pat. No. 4,902,658 filed Sept. 30, 1987, U.S. Pat. No. 4,453,023 and U.S. Pat. No. 4,453,022, all incorporated herein by reference.

While certain alkoxylation processes described above are capable of selectively providing narrow distributions of alkoxylates with the most prevalent having as low as one mole of oxyalkylene per mole of active hydrogen site, a particular advantage exists in the ability to provide a narrow distribution at higher levels of alkoxylation. For some crayon compositions, a relatively few alkoxylate species may provide the desired performance properties.

In accordance with step (ii) of the process of this invention, the alkoxylation product is reacted with an epoxide in the presence of a catalytically effective amount of a catalyst to produce a mixture of water soluble block polymers characterized by an ABCBA structure. The water soluble block polymers characterized by an ABCBA structure are described hereinabove.

The reaction of the alkoxylation product with an epoxide is conducted using a catalytically effective amount of a catalyst, e.g., about 0.01 to about 5, often about 0.1 to about 2, weight percent based on the weight the reactants. Suitable catalysts include any of the conventional ring-opening catalysts known in the art. Illustrative of such catalysts include, for example, potassium hydroxide, sodium hydroxide, stannous dioctanoate, cationic or protonic acid catalysts and the like.

Suitable cationic or protonic acid catalysts for use in step (ii) of the process of this invention include, for example, triflic acid, triflic acid salts, boron trifluoride etherate, boron trifluoride, methane sulfonic acid and the like. Particularly well suited catalysts are the triflic acid salts because of the high quality color (i.e., low color) characteristics of these compounds, the shelf-life characteristics of these compounds, and the wide variety of compounds that can be prepared which allows altering reaction conditions. Illustrative of these salts are diethylammonium triflate which is available as a solution from 3M Company as FC-520, triethylammonium triflate, ammonium triflate, diisopropylammonium triflate, ethyl diisopropylammonium triflate and the like.

Normally, the catalyst and the alkoxylation product are admixed and then the epoxide is added at the reaction temperature until the desired amount of epoxide has been added, then the resulting product is neutralized and can be finished, if desired, in any procedure including filtration or further reaction.

The molar concentration ratio of alkoxylation product to epoxide in step (ii) of the process of this invention can range from about 1.5:1 to about 8:1 or higher. Higher or lower molar ratios than stoichiometric, i.e., 2:1, give water soluble block polymer products with unreacted starting materials which can affect the properties of the water soluble block polymer products. The preferred molar ratio of alkoxylation product to epoxide is 2:1.

Mixtures or blends of water soluble block polymers characterized by an ABCBA structure with unreacted or other alkoxylation products may be desirable for use in this invention. The amount of alkoxylation product employed in combination with the water soluble block polymers characterized by an ABCBA structure can vary over a wide range, e.g., from about 1 to about 95 weight percent or greater, depending on the particular properties desired in the water soluble crayon compositions. The amount of alkoxylation product employed in combination with the water soluble block polymers characterized by an ABCBA structure should be sufficient to at least partially impart to the water soluble crayon compositions a breaking strength of at least about 1,200 grams as determined herein and a viscosity of no greater than about 650 centistokes at a temperature of 100° C. One or more alkoxylation products in combination with one or more water soluble block polymers characterized by an ABCBA structure can be suitably employed in the water soluble crayon compositions of this invention. This invention is not to be construed as being limited in regard to the amounts of water soluble block polymers characterized by an ABCBA structure and unreacted or other alkoxylation products in mixtures or blends thereof.

The temperature of the step (ii) reaction is sufficient to provide a suitable rate of reaction without degradation of the reactants or reaction products. Often, the temperatures range from between about 50° C. and 250° C., e.g., from about 100° C. to 175° C. The pressure may also vary widely, but when low-boiling epoxides are employed, a pressurized reactor is preferably used.

The step (ii) reaction medium can be agitated to ensure a good dispersal of the reactants and catalyst throughout the reaction medium. Also, the epoxide is usually added at a rate approximating that at which it can be reacted.

Neutralization may assist in the recovery of the catalyst from the water soluble block polymer product mixture. When neutralizing, acids that may tend to form catalyst-containing gel structures or solids that clog filtering apparatus should be avoided. Conveniently, sulfuric acid, phosphoric acid, propionic acid, benzoic acid and the like are used.

In accordance with step (iii) of the process of this invention, a coloring agent is added to the mixture of one or more water soluble block polymers characterized by an ABCBA structure to produce water soluble crayon compositions. The coloring agent is added to the mixture of water soluble block polymers characterized by an ABCBA structure with stirring to obtain a uniform solution or dispersion. The resulting water soluble crayon composition thus obtained in a liquid state has a low viscosity of from about 25 to about 650 centistokes; preferably a viscosity of no greater than about 300 centistokes, at a temperature of 100° C. Suitable coloring agents for use in this invention include conventional pigments, marking inks, dyes and the like known in the art. Mixtures of the same or different coloring agents may be useful in this invention.

Illustrative pigments useful in this invention include, for example, titanium dioxide, red iron oxide, ultramarine, carbon black, Carmine 6B, Phthalocyanine Blue, Lake Red pigments processed with nitro cellulose and mixtures thereof. These pigments are used in an amount of about 1 to 30 weight percent or greater, preferably about 4 to about 25 weight percent, of the total weight of the crayon composition. Below about 1 weight percent, the pigment generally fails to serve as a coloring agent, while amounts over about 30 weight percent, if used, may not provide further improved coloring effect. Dyes include those generally known in the art, for example, phthalocyanine dyes, pyrazolone dyes, Nigrosine dyes, anthraquinone dyes, azo dyes, chromium complex dyes, and the like. Examples of suitable dyes are set forth in U.S. Pat. No. 4,212,786. These dyes are used in an amount of about 1 to about 10 weight percent or greater, preferably about 3 to about 7 weight percent, of the total weight of the crayon composition. If less than about 1 weight percent of the dye used, the desired color effect will not be achieved, whereas use of more than about 10 weight percent of the dye is unlikely to produce a noticeably improved effect. According to this invention, the pigment and dye can be used together for adjusting color of the crayon as desired.

The water soluble crayon compositions of this invention may incorporate other additives such as known plasticizers in addition to the essential ingredients described above. Various plasticizers generally employed for crayons are usable. Examples are phthalates such as diethyl phthalate, dibutyl phthalate, dioctyl phthalate and butylbenzyl phthalate, epoxy compounds such as 2-ethylhexyl epoxyhexahydrophthalate, 2-ethylhexyl sebacate and tricresyl phosphate. These plasticizers are used in an amount of about 1 to about 10 weight percent of the total weight of the water soluble crayon composition.

Other additives which may be incorporated in conventional amounts into the water soluble crayon compositions of this invention include, for example, binders such as talc, scents, perfumes, flavors, sparkle or glitter ingredients, preservatives, stabilizers, dispersants, etc. An antifoam may be added in conventional amounts during formulation, e.g., stirring, of the water soluble crayon compositions.

The sparkle or glitter ingredients include those which are light reflective, light absorptive, light absorptive and which transmit a single different color, and light absorptive and which transmit two or more different colors. Suitable sparkle or glitter ingredients are commercially available under the names of TIMIRON ®, BIVIRON ®, COLORONA ®, DICHRONA ® and the like and contain varying amounts of mica and $TiO_2$. Other sparkle or glitter ingredients may include $Cr(OH)_2$ and mica, castor oil and mica, iron oxides and mica, bismuth oxychlorides, etc. These materials are commercially available. Aluminum and other metal particles also may be used.

When preservatives or stabilizers are used, they may include imidazolidienyl urea (0.25%–0.35%), methyl or propyl paraben (0.75% –1.0% and 0.25%–0.35%, respectively), DOWOCIL ® 200 (0.1%–0.5%), and so forth. Bactericides, fungicides, etc. also may be used in addition to the preservatives or stabilizers.

The crayons of this invention are prepared by the following method. In accordance with steps (iv) and (v) of the process of this invention, the water soluble crayon composition in a liquid state at an elevated temperature is placed into a mold and solidified by cooling. Alternatively, the water soluble crayon composition is extruded into a cylinder, square pillar or the like at room temperature. The water soluble crayon compositions of this invention in a liquid state have a low viscosity as mentioned above, e.g., a preferred viscosity of no greater than about 300 centistokes at a temperature of 100° C., and are therefore advantageously shapable with molds or extruders.

The water soluble crayon compositions of this invention exhibit little or no tackiness after hardening and mold release. The water soluble crayon compositions harden readily upon cooling, e.g., when exposed to a temperature of from about 10° C. to 15° C. During formulation of the water soluble crayon compositions, little or no foaming is observed upon stirring.

The crayons of this invention prepared by the above method remain free of degradation over a prolonged period of time even when not contained in suitable closed cases. The crayons produced in accordance with the present invention may be used and sharpened in the same manner as conventional crayons and are nontoxic. As used herein, the term "crayon" is meant to include crayons, color pencils and other writing, marking or drawing materials of various shapes and sizes that can have incorporated therein the water soluble crayon compositions of this invention.

The crayons of this invention have suitable hardness, e.g., preferably at least about 1,200 grams of barrel strength, and are smoothly applicable on sheets and plates of paper, plastics and metals and various other materials with high uniformity, e.g., no undesirable piling, skipping or rose-ing. Even when the crayons are subjected to high temperatures as in the sun, e.g., preferably at least a 50° C. wilting temperature, solid state stability is exhibited by the crayons. The crayon applied is excellent in adhesion and free of any color transfer since the crayon applied is cured on drying. The pigment in the crayons does not bloom or sweat during long period storage or temperature cycling. The crayons retain these outstanding characteristics substantially free of any changes even after a long period storage.

It will be appreciated that the water soluble crayon compositions can be removed from the processing equipment and pouring equipment simply by washing with water. This enables the equipment to be changed over to a different coloring formulation without undue difficulty. Also, undesirable crayon markings on walls, furniture, clothing, appliances, etc., can be removed simply by washing with water.

Copending U.S. patent application Ser. No. 07/452,475 filed Dec. 19, 1989 and incorporated herein by reference, discloses water soluble crayon decompositions which are comprised of (i) one or more water soluble alkoxylation products and (ii) a coloring agent, and to crayons produced therefrom. This copending application also relates to processes for the production of water soluble crayon compositions and for the manufacture of crayons.

This invention is further illustrated by the following examples.

For purposes of this invention, the following designations have the indicated meanings:

| | |
|---|---|
| Alkoxylation Product A | A nonionic surfactant compound commercially available from Union Carbide Chemicals and Plastics Company Inc., Danbury, Connecticut, as TERGITOL ® nonionic surfactant NP-40. |
| Alkoxylation Product B | A poly(oxyethylene)glycol compound commercially available from Union Carbide Chemicals and Plastics Company Inc., Danbury, Connecticut, as CARBOWAX ® polyethylene glycol MPEG 5000. |
| Alkoxylation Product C | A poly(oxyethylene)glycol compound commercially available from Union Carbide Chemicals and Plastics Company Inc., Danbury, Connecticut, as CARBOWAX ® polyethylene glycol MPEG 2000. |
| Alkoxylation Product D | A nonionic surfactant compound commercially available from Union Carbide Chemicals and Plastics Company Inc., Danbury, Connecticut, as TERGITOL ® nonionic surfactant 15-S-40. |
| Alkoxylation Product E | A 40 mole ethoxylate of $C_{12}$ and $C_{14}$ linear primary alcohols having a |

-continued

| | |
|---|---|
| Alkoxylation Product F | A nonionic surfactant compound commercially available from Union Carbide Chemicals and Plastics Company Inc., Danbury, Connecticut, as TERGITOL ® nonionic surfactant NP-70. |
| Alkoxylation Product G | A 60 mole ethoxylate of $C_{12}$ and $C_{14}$ linear primary alcohols having a conventional distribution of alkoxylate species. |
| Epoxide A | A diglycidyl ether of bisphenol A commercially available from Shell Chemical Company, Houston, Texas, as EPON ® 828. |
| Catalyst A | A 50 percent aqueous solution of sodium hydroxide. |
| Color Treating Agent A | A 12 percent aqueous solution of sodium borohydride. |
| Pigment A | A blue pigment commercially available from BASF Wyandotte Corporation, Holland, Michigan, as Heliogen Blue L6975F. |

EXAMPLES 1 THROUGH 14

Preparation of Water Soluble Block Polymers Characterized by an ABCBA Structure Into a 500 milliliter reaction vessel equipped with a thermometer, nitrogen inlet and outlet and mechanical stirrer was charged an amount of alkoxylation product identified in Table A below. To the alkoxylation product was added an amount of catalyst identified in Table A and also an amount of color treating agent identified in Table A. The resulting mixture was then stirred and heated to a temperature specified in Table A under a nitrogen atmosphere. Into an addition funnel was added an epoxide which was then added to the reaction vessel over a period of time and in an amount specified in Table A. The reaction vessel was maintained at the reaction temperature for a period of time specified in Table A. The analysis for unreacted epoxide specified in Table A revealed the degree of completeness of the reaction on a conversion of diepoxide basis. To neutralize the catalyst, the reaction product was cooled, 85 percent aqueous phosphoric acid was added and the product was stirred. The viscosity (centistokes) of the water soluble block polymers characterized by an ABCBA structure was measured with a capillary viscometer at a temperature of 100° C. and the results are listed in Table A. The surface tension (dynes/centimeter) of the water soluble crayon compositions was measured by the Wilhelmy plate method and the results are listed in Table A.

TABLE A

Preparation of Water Soluble Block Polymers Characterized by an ABCBA Structure

| | Example | | | | | | |
|---|---|---|---|---|---|---|---|
| | 1 | 2 | 3 | 4 | 5 | 6 | 7 |
| Alkoxylation Product | A | B | C | D | F | A | A |
| Alkoxylation Product, grams | 987 | 506 | 652 | 564 | 1027 | 545 | 510 |
| Epoxide | A | A | A | A | A | A | A |
| Epoxide, grams | 99.3 | 30.8 | 61.9 | 53.7 | 58.7 | 51.5 | 51.5 |
| Alkoxylation Product/ Epoxide, mole ratio | 2:1 | 2:1 | 2:1 | 2:1 | 2:1 | 2:1 | 2:1 |
| Catalyst | A | A | A | A | A | A | A |
| Catalyst, grams | 0.45 | 0.42 | 1.07 | 0.63 | 1.22 | 0.83 | 0.48 |
| Color Treating Agent | A | A | A | A | A | A | A |
| Color Treating Agent, grams | 0.35 | 0.36 | 0 | 0 | 0 | 1.8 | 0.35 |
| Reaction Temperature, °C. | 140–155 | 130–140 | 140 | 140–160 | 140–160 | 150–160 | 155 |
| Reaction Time, hours | 14 | 8 | 4.5 | 31 | 6.5 | 7 | 3.75 |
| Epoxide Addition Time, hours | 0.5 | 0.1 | 0.5 | 0.75 | 0.33 | 0.5 | 0.5 |
| Epoxide Conversion, % | 92.4 | — | 88.6 | 63.5 | 93.8 | 92.9 | 97.5 |
| Product Viscosity, centistokes | 344 | 308 | 171 | 90 | 360 | — | 342 |
| Surface Tension, dynes/cm | — | — | 53.2 | 38.4 | 46.8 | 43.3 | 42.9 |

| | Example | | | | | | |
|---|---|---|---|---|---|---|---|
| | 8 | 9 | 10 | 11 | 12 | 13 | 14 |
| Alkoxylation Product | A | F | E | E | F | F | G |
| Alkoxylation Product, grams | 1577 | 561 | 537 | 1215 | 584 | 457 | 520 |
| Epoxide | A | A | A | A | A | A | A |
| Epoxide, grams | 151.7 | 32.4 | 52.3 | 118.8 | 33.4 | 26.7 | 34.8 |
| Alkoxylation Product/ Epoxide, mole ratio | 2:1 | 2:1 | 2:1 | 2:1 | 2:1 | 2:1 | 2:1 |
| Catalyst | A | A | A | A | A | A | A |
| Catalyst, grams | 1.07 | 0.87 | 0.50 | 1.0 | 0.21 | 0.12 | 0.37 |
| Color Treating Agent | A | A | A | A | A | A | A |
| Color Treating Agent, grams | 0.86 | 0.25 | 0.42 | 0.61 | 0.28 | 0.30 | 0.32 |
| Reaction Temperature, °C. | 155 | 170 | 155 | 155 | 140 | 140 | 150 |
| Reaction Time, hours | 4 | 2 | 2.5 | 1.5 | 2 | 1.5 | 4 |
| Epoxide Addition Time, hours | 1.0 | 0.33 | 1.33 | 1.5 | 0.16 | 0.25 | 0.5 |

TABLE A-continued

Preparation of Water Soluble Block Polymers Characterized by an ABCBA Structure

| | | | | | | | |
|---|---|---|---|---|---|---|---|
| Epoxide Conversion, % | 97 | 92.9 | 95 | 94 | 97.9 | 97 | 95.8 |
| Product Viscosity, centistokes | — | 124 | 206 | — | 622 | 615 | 596 |
| Surface Tension, dynes/cm | — | — | 44.9 | 45 | 48.4 | 47.2 | — |

EXAMPLES 15 THROUGH 54

Preparation of Water Soluble Crayon Compositions and Crayons Therefrom

Water soluble crayon compositions were prepared by mixing a molten water soluble block polymer characterized by an ABCBA structure prepared in Examples 1 through 14 with talc (binder) and a pigment in the proportions specified in Table B below.

Crayons were prepared from the water soluble crayon compositions identified in Table B by the following procedure. The water soluble crayon compositions were melted in an oven at a temperature of 80° C. and the molten material was then cast into disposable plastic syringes which were lined with wax paper to act as a mold release. After cooling to room temperature, the solid stick was pushed from the mold by the syringe plunger. This procedure produced crayons having a diameter of about 6.7 millimeters, a length of about 60–80 millimeters and a weight of about 3.5–4.5 grams. The solid sticks were sharpened and tested for the properties specified in Table C below.

The breaking strength (grams) of the crayons was measured by placing the barrel of the crayon stick horizontally between force sensors of an Instron tester. The force required to fracture the crayon sticks was measured in grams and the results are listed in Table C.

The wilting temperature (° C.) of the crayons was measured by mounting the crayon sticks horizontally in a wooden block which had holes drilled to accept about ¼ of the length of the crayon. The wooden block with crayons was then placed in an air-bath thermostat (oven) and the temperature was increased in 1° C. increments. The temperature at which the crayon drooped, i.e., folded over from the horizontal position, was recorded as the wilting temperature and the results are listed in Table C.

Washability tests were also performed by marking with the crayons on a section of painted laboratory wall. A mark was also made with a commercial paraffin crayon. A damp towel was wiped across the crayon marks. The crayons listed in Table C were wiped clean after 1–2 wipes. The paraffin crayon mark required additional wipes, sometimes with the use of ethanol solvents.

TABLE B

Preparation of Water Soluble Crayon Compositions

| | Example | | | | | | | | | |
|---|---|---|---|---|---|---|---|---|---|---|
| | 15 | 16 | 17 | 18 | 19 | 20 | 21 | 22 | 23 | 24 |
| Water Soluble Block Polymer Prepared in Example No. | 1 | 2 | 3 | 4 | 5 | 6 | 7 | 8 | 9 | 10 |
| Water Soluble Block Polymer, wt. % | 100 | 100 | 100 | 100 | 100 | 100 | 100 | 100 | 100 | 100 |
| Talc, wt. % | 0 | 0 | 0 | 0 | 0 | 0 | 0 | 0 | 0 | 0 |
| Pigment | — | — | — | — | — | — | — | — | — | — |
| Pigment, wt. % | 0 | 0 | 0 | 0 | 0 | 0 | 0 | 0 | 0 | 0 |

| | Example | | | | | | | | | |
|---|---|---|---|---|---|---|---|---|---|---|
| | 25 | 26 | 27 | 28 | 29 | 30 | 31 | 32 | 33 | 34 |
| Water Soluble Block Polymer Prepared in Example No. | 11 | 12 | 13 | 14 | 1 | 7 | 9 | 10 | 12 | 13 |
| Water Soluble Block Polymer, wt. % | 100 | 100 | 100 | 100 | 84 | 84 | 84 | 84 | 84 | 84 |
| Talc, wt. % | 0 | 0 | 0 | 0 | 14 | 14 | 14 | 14 | 14 | 14 |
| Pigment | — | — | — | — | A | A | A | A | A | A |
| Pigment, wt. % | 0 | 0 | 0 | 0 | 2 | 2 | 2 | 2 | 2 | 2 |

TABLE C

Crayon Properties

| | Example | | | | | | | | | |
|---|---|---|---|---|---|---|---|---|---|---|
| | 35 | 36 | 37 | 38 | 39 | 40 | 41 | 42 | 43 | 44 |
| Water Soluble Crayon Composition Prepared in Example No. | 15 | 16 | 17 | 18 | 19 | 20 | 21 | 22 | 23 | 24 |
| Breaking Strength, grams | 1800 | <1000 | <1000 | <1000 | — | — | 1517 | — | 769 | 1800 |
| Wilting Temperature, °C. | 45 | — | — | — | — | — | 46 | — | 48 | 53 |

| | Example | | | | | | | | | |
|---|---|---|---|---|---|---|---|---|---|---|
| | 45 | 46 | 47 | 48 | 49 | 50 | 51 | 52 | 53 | 54 |
| Water Soluble Crayon Composition Prepared | 25 | 26 | 27 | 28 | 29 | 30 | 31 | 32 | 33 | 34 |

TABLE C-continued

| Crayon Properties in Example No. | | | | | | | | | | |
|---|---|---|---|---|---|---|---|---|---|---|
| Breaking Strength, grams | — | — | 1860 | — | 1800 | 1517 | 1890 | 1962 | 3624 | 1930 |
| Wilting Temperature, °C. | — | — | — | — | 45 | 46 | 48 | 53 | — | — |

Although the invention has been illustrated by the preceding examples, it is not to be construed as being limited thereby; but rather, the invention encompasses the generic area as hereinbefore disclosed. Various modifications and embodiments can be made without departing from the spirit and scope thereof.

We claim:

1. The water soluble crayon composition comprising (i) one or more water soluble block copolymers characterized by an ABCBA structure of:
   (1) A blocks or segments which can be represented as follows:

$[R_{20}—]$ wherein $R_{20}$ is the same or different and is an organic residue of an organic compound having at least one active hydrogen;
   (2) B blocks or segments which can be represented as follows:

$[—CHR_{21}—CHR_{22}O—]_m$ wherein $R_{21}$ and $R_{22}$ are the same or different and are hydrogen or alkyl (including hydroxy- and halo-substituted alkyl) and m is an integer of at least 1; and
   (3) a C block or segment which can be represented as follows:

$[—R_{23}—]$ wherein $R_{23}$ is an organic reside of an epoxide containing two or more epoxy groups and (ii) a coloring agent.

2. The water soluble crayon composition of claim 1 wherein each terminal oxy moiety of the B block or segment is individually connected to the terminal alkylene moiety of the C block or segment through a monovalent bond to form an oxyalkylene group and each terminal alkylene moiety of the B block or segment is individually connected to the terminal oxy moiety of the A block or segment through a monovalent bond to form an oxyalkylene group.

3. The water soluble crayon composition of claim 1 wherein the one or more water soluble block polymers characterized by an ABCBA structure have an average molecular weight of from about 500 to about 10,000.

4. The water soluble crayon composition of claim 2 wherein the one or more water soluble block polymers characterized by an ABCBA structure have an average molecular weight of from about 1,500 to about 7,500.

5. The water soluble crayon composition of claim 1 wherein $R_{20}$ is an organic residue of an alcohol.

6. The water soluble crayon composition of claim 5 wherein the alcohol comprises a monohydric, aliphatic alcohol having from 1 to about 20 carbon atoms.

7. The water soluble crayon composition of claim 5 wherein the alcohol is selected from nonylphenol, n-dodecanol, a mixture of $C_8$–$C_{10}$ alcohols, a mixture of $C_{11}$–$C_{15}$ alcohols or a mixture of $C_{12}$ and $C_{14}$ alcohols.

8. The water soluble crayon composition of claim 5 wherein the alcohol is a mixture of $C_{12}$ and $C_{14}$ alcohols.

9. The water soluble crayon composition of claim 1 wherein $R_{21}$ and $R_{22}$ are hydrogen and m is an integer of from 1 to about 60.

10. The water soluble crayon composition of claim 1 wherein $R_{21}$ and $R_{22}$ are hydrogen and m is an integer of 40.

11. The water soluble crayon composition of claim 1 wherein the epoxide is selected from bis(epoxyalkyl)cycloalkanes, bis(epoxycycloalkyl)-ethers, bis(epoxyalkoxy)benzenes and bis(epoxyalkoxyphenyl)alkanes.

12. The water soluble crayon composition of claim 1 wherein the epoxide comprises a di(epoxyalkyl)diether of a dihydric phenol.

13. The water soluble crayon composition of claim 1 wherein the epoxide comprises the diglycidyl diether of 2,2-bis(4-hydroxyphenyl)-propane.

14. The water soluble crayon composition of claim 1 wherein the A and B blocks or segments together represent the organic residue of a fatty alcohol ethoxylate.

15. The water soluble crayon composition of claim 14 wherein the fatty alcohol ethoxylate has a conventional distribution of alkoxylate species.

16. The water soluble crayon composition of claim 14 wherein the fatty alcohol ethoxylate has a narrow distribution of alkoxylate species.

17. The water soluble crayon composition of claim 14 wherein the fatty alcohol ethoxylate is manufactured by ethoxylation of linear or branched $C_{10}$–$C_{16}$ saturated alcohols.

18. The water soluble crayon composition of claim 14 wherein the fatty alcohol ethoxylate has an average molecular weight of from about 250 to about 3,000.

19. The water soluble crayon composition of claim 1 wherein the coloring agent comprises one or more pigments or dyes.

20. The water soluble crayon composition of claim 1 further comprising a binder.

21. The water soluble crayon composition of claim 20 wherein the binder comprises talc.

22. The water soluble crayon composition of claim 1 having a viscosity of from about 25 to about 650 centistokes at a temperature of 100° C.

23. The water soluble crayon composition of claim 1 wherein the one or more block polymers character by an ABCBA structure comprise from about 1 to about 95 weight percent or greater of the total weight of the water soluble crayon composition.

24. The water soluble crayon composition of claim 1 wherein the coloring agent comprises from about 1 to about 30 weight percent or greater of the total weight of the water soluble crayon composition.

25. The water soluble crayon composition of claim 20 wherein the binder comprises from about 1 to about 30 weight percent or greater of the total weight of the water soluble crayon composition.

26. The water soluble crayon composition of claim 1 further comprising one or more alkoxylation products.

27. The water soluble crayon composition of claim 26 wherein the one or more alkoxylation products comprise from about 1 to about 95 weight percent or greater of the total weight of the water soluble crayon composition.

28. A process for the manufacture of a water soluble crayon composition which comprises:
(i) preparing an alkoxylation product having the structure AB by contacting an organic compound having at least one active hydrogen with an alkylene oxide in the presence of a catalytically effective amount of an alkoxylation catalyst under alkoxylation conditions;
(ii) preparing a mixture of one or more water soluble block polymers characterized by an ABCBA structure by contacting said alkoxylation product with an epoxide in the presence of a catalytically effective amount of a catalyst; and
(iii) preparing said water soluble crayon composition by adding a coloring agent to the mixture of one or more water soluble block polymers characterized by an ABCBA structure, wherein
(1) A blocks or segments can be represented as follows:

$[R_{20}-]$ wherein $R_{20}$ is the same or different and is an organic residue of an organic compound having at least one active hydrogen;
(2) B blocks or segments can be represented as follows:

$[-CHR_{21}-CHR_{22})-]_m$ wherein $R_{21}$ and $R_{22}$ are the same or different and are hydrogen or alkyl (including hydroxy- and halo-substituted alkyl) and m is an integer of at least 1; and
(3) a C block or segment can be represented as follows:
$[-R_{23}-]$ wherein $R_{23}$ is an organic residue of an epoxide containing two or more epoxy groups.

29. The process of claim 28 wherein the organic compound having at least one active hydrogen comprises an alcohol.

30. The process of claim 29 wherein the alcohol comprises a monohydric, aliphatic alcohol having from 1 to about 20 carbon atoms.

31. The process of claim 29 wherein the alcohol is selected from nonylphenol, n-dodecanol, a mixture of $C_8-C_{10}$ alcohols, a mixture of $C_{11}-C_{15}$ alcohols or a mixture of $C_{12}$ and $C_{14}$ alcohols.

32. The process of claim 29 wherein the alcohol is a mixture of $C_{12}$ and $C_{14}$ alcohols.

33. The process of claim 28 wherein the alkylene oxide is ethylene oxide, propylene oxide or mixtures thereof.

34. The process of claim 28 wherein the alkoxylation catalyst comprises a calcium-containing composition or an alkali metal hydroxide.

35. The process of claim 34 wherein the calcium-containing composition comprises calcium oxide, calcium hydroxide or mixtures thereof.

36. The process of claim 34 wherein the calcium-containing composition is modified with a divalent or polyvalent oxyacid or a divalent or polyvalent metal salt of an oxyacid.

37. The process of claim 34 wherein the calcium-containing composition is modified with sulfuric acid.

38. The process of claim 28 wherein the alkoxylation product comprises a fatty alcohol ethoxylate.

39. The process of claim 38 wherein the fatty alcohol ethoxylate has a conventional distribution of alkoxylate species.

40. The process of claim 38 wherein the fatty alcohol ethoxylate has a narrow distribution of akloxylate species.

41. The process of claim 38 wherein the fatty alcohol ethoxylate is manufactured by ethoxylation of linear or branched $C_{10}-C_{16}$ saturated alcohols.

42. The process of claim 38 wherein the fatty alcohol ethoxylate has an average molecular weight of from about 250 to 3,000.

43. The process of claim 28 wherein the epoxide is selected from bis(epoxyalkyl)cycloalkanes, bis(epoxycycloalkyl)ethers, bis(epoxyalkoxy)benzenes and bis(epoxyalkoxyphenyl)alkanes.

44. The process of claim 28 wherein the epoxide comprises a di(epoxyalkyl)diether of a dihydric phenol.

45. The process of claim 28 wherein the epoxide comprises the diglycidyl diether of 2,2-bis(4-hydroxyphenyl)propane.

46. The process of claim 28 wherein the catalyst of step (ii) comprises a ring-opening catalyst.

47. The process of claim 28 wherein the catalyst of step (ii) comprises sodium hydroxide, triflic acid or triflic acid salts.

48. The process of claim 28 wherein the molar concentration ratio of alkoxylation product to epoxide is from about 1.5:1 to about 8:1 or greater.

49. The process of claim 28 wherein the molar concentration ratio of alkoxylation product to epoxide is 2:1.

50. The process of claim 28 wherein each terminal oxy moiety of the B block or segment is individually connected to the terminal alkylene moiety of the C block or segment through a monovalent bond to form an oxyalkylene group and each terminal alkylene moiety of the B block or segment is individually connected to the terminal oxy moiety of the A block or segment through a monovalent bond to form an oxyalkylene group.

51. The process of claim 28 wherein the one or more water soluble block polymers characterized by an ABCBA structure have an average molecular weight of from about 500 to about 10,000.

52. The process of claim 28 wherein the one or more water soluble block polymers characterized by an ABCBA structure have an average molecular weight of from about 1,500 to about 7,500.

53. The process of claim 28 wherein $R_{20}$ is an organic residue of an alcohol.

54. The process of claim 53 wherein the alcohol comprises a monohydric, aliphatic alcohol having from 1 to about 20 carbon atoms.

55. The process of claim 53 wherein the alcohol is selected from nonylphenol, n-dodecanol, a mixture of $C_8-C_{10}$ alcohols, a mixture of $C_{11}-C_{15}$ alcohols or a mixture of $C_{12}$ and $C_{14}$ alcohols.

56. The process of claim 53 wherein the alcohol is a mixture of $C_{12}$ and $C_{14}$ alcohols.

57. The process of claim 28 wherein $R_{21}$ and $R_{22}$ are hydrogen and m is an integer of from 1 to about 60.

58. The process of claim 28 wherein $R_{21}$ and $R_{22}$ are hydrogen and m is an integer of 40.

59. The process of claim 28 wherein the epoxide is selected from bis(epoxyalkyl)cycloalkanes, bis(epoxycycloalkyl)ethers, bis(epoxyalkoxy)benzenes and bis-(epoxyalkoxyphenyl)alkanes.

60. The process of claim 28 wherein the epoxide comprises a di(epoxyalkyl(diether of a dihydric phenol.

61. The process of claim 28 wherein the epoxide comprises the diglycidyl diether of 2,2-bis(4- hydroxyphenyl)propane.

62. The process of claim 28 wherein the A and B blocks or segments together represent the organic residue of a fatty alcohol ethoxylate.

63. The process of claim 62 wherein the fatty alcohol ethoxylate has a conventional distribution of alkoxylate species.

64. The process of claim 62 wherein the fatty alcohol ethoxylate has a narrow distribution of alkoxylate species.

65. The process of claim 62 wherein the fatty alcohol ethoxylate is manufactured by ethoxylation of linear or branched $C_{10}$–$C_{16}$ saturated alcohols.

66. The process of claim 62 wherein the fatty alcohol ethoxylate has an average molecular weight of from about 250 to about 3,000.

67. The process of claim 28 wherein the coloring agent comprises one or more pigments or dyes.

68. The process of claim 28 further comprising adding a binder to the water soluble crayon composition.

69. The process of claim 68 wherein the binder comprises talc.

70. The process of claim 28 wherein the water soluble crayon composition has a viscosity of from about 25 to about 650 centistokes at a temperature of 100° C.

71. The process of claim 28 wherein the one or more block polymers characterized by an ABCBA structure comprise from about 1 to about 95 weight percent or greater of the total weight of the water soluble crayon composition.

72. The process of claim 28 wherein the coloring agent comprises from about 1 to about 30 weight weight percent or greater of the total weight of the soluble crayon composition.

73. The process of claim 68 wherein the binder comprises from about 1 to about 30 weight percent or greater of the total weight of the water soluble crayon composition.

74. The process of claim 28 further comprising adding one or more alkoxylation products to the water soluble crayon composition.

75. The process of claim 74 wherein the one or more alkoxylation products comprises one or more fatty alcohol ethoxylates.

76. A crayon prepared from a water soluble crayon composition of claim 1.

77. A crayon prepared from the water soluble crayon composition manufactured by the process of claim 28.

78. A process for the manufacture of a crayon which comprises:
   (i) preparing a water soluble crayon composition in accordance with the process of claim 28;
   (ii) pouring said water soluble crayon composition into a mold; and
   (iii) solidifying said water soluble crayon composition by cooling.

79. A crayon prepared by the process of claim 78.

* * * * *